United States Patent

Loyd

[15] 3,693,235
[45] Sept. 26, 1972

[54] SPLIT RETAINER FOR CHECK VALVE SPRINGS

[72] Inventor: Calvin D. Loyd, Peoria, Ill.

[73] Assignee: Caterpillar Tractor Co., Peoria, Ill.

[22] Filed: Sept. 4, 1970

[21] Appl. No.: 69,746

[52] U.S. Cl. ..................29/412, 29/416, 251/337
[51] Int. Cl. ...........................................B23p 17/00
[58] Field of Search ........251/337, 291; 29/412, 411, 29/413–416

[56] References Cited

UNITED STATES PATENTS

| 1,597,029 | 8/1926 | Fisher | 251/337 |
| 3,028,660 | 4/1962 | Stratton et al. | 29/412 X |
| 3,179,477 | 4/1965 | Carter | 29/149.5 B X |
| 3,298,085 | 1/1967 | Bleicher | 29/416 X |
| 3,499,201 | 3/1970 | Roos | 29/413 X |

FOREIGN PATENTS OR APPLICATIONS

| 713,399 | 8/1954 | Great Britain | 29/412 |

Primary Examiner—John F. Campbell
Assistant Examiner—Victor A. DiPalma
Attorney—Fryer, Tjensvold, Feix, Phillips & Lempio

[57] ABSTRACT

An original retainer is precisely fabricated from a single piece of material of selected properties. The original retainer is then substantially evenly fractured into complementary parts to define a split retainer, by subjecting it to a sharp blow applied as by means of a hammer and anvil. The resulting split retainer parts are then re-assembled about a check valve stem of, for example, a capsule valve, etc., and are secured in place by a locking washer disposed thereabout. Since the complementary parts are halves of an original retainer, the resulting confronting surfaces formed during the fracturing process, as well as the axial dimensions of shoulders, etc., are perfectly matched to provide thereby a precisely dimensioned retainer upon assembly.

3 Claims, 3 Drawing Figures

PATENTED SEP 26 1972          3,693,235

INVENTORS
CALVIN D. LOYD

BY
Fryer, Tjensvold, Feix, Phillips & Lempio
ATTORNEYS

INVENTORS
CALVIN D. LOYD

SPLIT RETAINER FOR CHECK VALVE SPRINGS

BACKGROUND OF THE INVENTION

1. Field

The present invention relates to a method for fabricating, from a single original retainer, a split retainer capable of being re-assembled, and further relates to the resulting product of the method.

2. Prior Art

One form of conventional retainer such as employed, for example, in springs which actuate the valve mechanism of a capsule or check valve, is generally of a horseshoe-shaped cross section with a radially inwardly extending gap formed through one side of the length thereof. The gap permits assembly of the retainer below the flared end of the valve stem of the valve, while allowing the opposite end of the retainer to extend into the spring. Shoulders on the stem and retainer provide a mutually locking function between the retainer and spring.

In another prior art design, the retainer defines a split ring configuration, wherein the halves of the retainer are individually assembled to define the complete retainer capable of extending into and providing confinement of the spring relative to an associated valve stem.

The horseshoe type retainer configuration is disadvantageous in that the spring retained thereby tends to cock due to the fact that the gap is unsymmetrically disposed in the retainer, i.e., extends radially inward from one side only. The situation is aggravated by metal chips which are dislodged from the sharp edge of the gap by force of the engaging spring surface. The cocking and metal chip situations generally cause malfunctioning of the associated fuel capsule valve.

On the other hand, the prior art split retainers have other disadvantages which cause similar malfunctioning. In conventional split retainer fabrication techniques, two preformed retainers are utilized to form one finished split retainer, wherein one-half of each retainer is ground away. The two remaining halves are then matched, placed about the check valve stem, and are locked in place by means of a washer. The latter configuration alleviates the problem inherent in the first configuration, regarding the cocking effect of the spring due to the existence of the large unsymmetrical gap. However, tolerances in fabricating the split retainer sometimes allow a mismatch of several one-thousandths of an inch in the various critical dimensions of the two halves of the retainer. In this event, the spring is permitted to load the washer unevenly on opposing sides, which in turn produces the aforementioned cocking action of the spring and check valve, and the attendant malfunctioning problems. In addition this latter retainer fabricating process results in excessive waste since only half of each originally formed retainer is used.

SUMMARY OF THE INVENTION

The invention provides an improved split retainer configuration, and a method for fabricating the same, while circumventing the problems associated with prior art retainer configurations. To this end, an "original" retainer is first formed of a preselected material of preferred properties, and is thereafter split in half to provide two complementary halves having similar or matching dimensions. The material is preferably a fine granular structure which allows readily splitting the original retainer substantially along a selected plate therethrough. Assembly of the invention split retainer about the check valve stem of a capsule valve provides an assembled retainer of precisely matching dimensions. The configuration overcomes the prior art problems associated with inaccurate dimensions and formation of metal chips, with resulting cocking of the spring, while eliminating the waste of material and cumbersome matching during assembly procedures.

DESCRIPTION OF THE PREFERRED EMBODIMENTS

Figure 1:
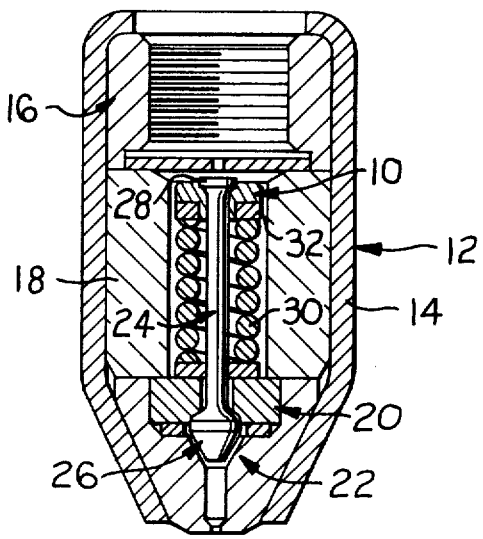
FIG. 1 is a cross section of a nozzle assembly employed, for example, in a fuel capsule valve, illustrating an assembled split retainer in accordance with the invention.

Referring to FIG. 1 there is shown an assembled split retainer 10 of the invention as employed, by way of example only, in a nozzle assembly 12 of a fuel capsule valve (not shown). Although the split retainer is particularly described with reference to the valve stem and spring mechanism of a check valve, it is to be understood that the invention concepts may be employed to fabricate other split (retainer) devices which are capable of being re-assembled about a shaft, etc., in the manner described herein.

The nozzle assembly 12 in FIG. 1 is itself generally conventional in the art, and includes a case 14, a nut assembly 16, a sleeve 18, a check assembly 20, and a seal assembly 22. A check valve 24 having a seal means 26 at one end and a retaining flange 28 at the opposite end thereof, is axially disposed within the sleeve 18 with the seal means 26 adapted to bear against the check assembly 20 to effect a high pressure seal. A spring 30 is disposed about the check valve 24. One end of the spring 30 bears against the check assembly 20, and the other end is confined under selected compression by the split retainer 10 which is held in place by a locking washer 32. The spring 30 urges the check valve seal means 26 against the check assembly 20 to thus effect the seal.

As may be seen, assembly of the check valve 24 and spring 30 is facilitated by employing the split retainer 10, wherein for example, the spring 30 is first compressed, whereupon the locking washer 32 is placed over the retaining flange 28 and on the confronting end of spring 30. The halves of the split retainer 10 are then slipped into position about the end of check valve 24 below the flange 28 thereof, with the smaller outside diameter of the retainer halves extending into the inside diameter of the locking washer 32. Upon releasing the spring 30, the halves of the split retainer 10 are urged against the mating cylindrical shoulder of the flanges 28, and are held together as a single unit by the locking washer 32. The force exerted by the spring 30 against the retaining flange 28 via the split retainer 10, effects the desired seal between the check assembly 20 and the seal means 26.

Figure 3:
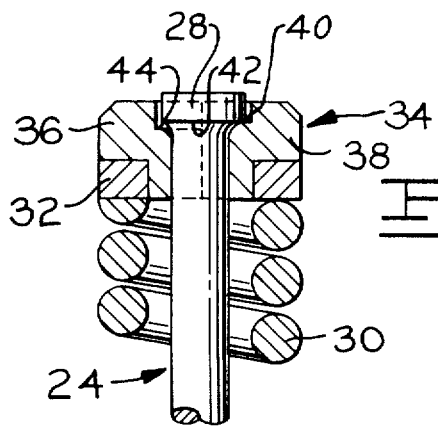
FIG. 3 is a partial cross section of a prior art split retainer configuration, depicting the attendant disadvantages caused by the unequal dimensions inherent in prior art split retainers.

FIG. 3 shows the assembly of a split retainer 34 of the prior art, depicting one of the most common disadvantages experienced thereby, which disadvantage is overcome by the invention process and resulting product. As previously noted, prior art retainers are formed by grinding away half of two different retainers and then assembling the remaining two halves thereof (indicated here by numerals 36, 38) about the retaining flange 28 of the check valve 24. The halves 36, 38 are locked in place via the locking washer 32, viz, by the pressure exerted by the spring 30 thereagainst. As may be seen, while the retainer half 38 has a shoulder 40 which fits snugly against a confronting shoulder 42 of the flange 28, the half 36 which has formed of a retainer with different original dimensions, has a shoulder 44 which is spaced from and thus does not bear against the confronting shoulder 42 of the check valve flange 28. Pressure exerted by the spring 30 thus tends to impart further axial movement to the half 36 until the shoulder 44 thereof bears against the shoulder 42, which action causes the washer 32 to tilt accordingly. This imparts a cocking action to the spring 30 which results in valve malfunction. Obviously, dimensional differences other than those described here by way of example, may be experienced by prior art split retainer configurations.

Since the split retainer 10 of the present invention is formed by splitting a single original retainer, the facing portions formed by the splitting process match exactly, and the axial dimensions of the resulting complementary halves are exactly the same. Thus, upon re-assembly of the two complementary halves as shown in FIG. 1, the shoulders, spring bearing surfaces, etc., are exactly symmetrical. That is, since both pieces are halves formed of the same original part, misalignment of the complementary portions of the two pieces is precluded. Furthermore, economic advantages are gained by averting the waste previously experienced with prior art split retainer manufacturing, wherein half of two retainers are ground away, and only the remaining two halves of the two retainers are assembled to define a single complete, split retainer.

Accordingly, the product of the invention provides a generally cylindrical retainer, constituting two separate complementary parts formed of the same original retainer, which parts have exactly matching confronting surfaces upon reassembly, and wherein the critical axial dimensions of the shoulders and other surfaces of each half match exactly upon re-assembly.

In accordance with the invention, the "original" retainers are formed as by a machining, molding, etc. process, preferably from a cold finished steel bar of, for example, SAE 52100 material. The retainers are then through-hardened to a hardness of, for example, Rockwell 30N79-82. The resulting fine granular structure of the above material allows the original retainers to split in a substantially straight line along a substantially even plane, when subjected to high stresses such as received from a sharp blow applied to the retainer along the line of the plane. The process and associated apparatus of the invention is adapted to subject the retainers to such a sharp blow.

Although a specific material is described herein, it is to be understood that any fine granular structure material which is readily susceptible to even splitting upon being subjected to a sharp blow, may be employed.

Figure 2:
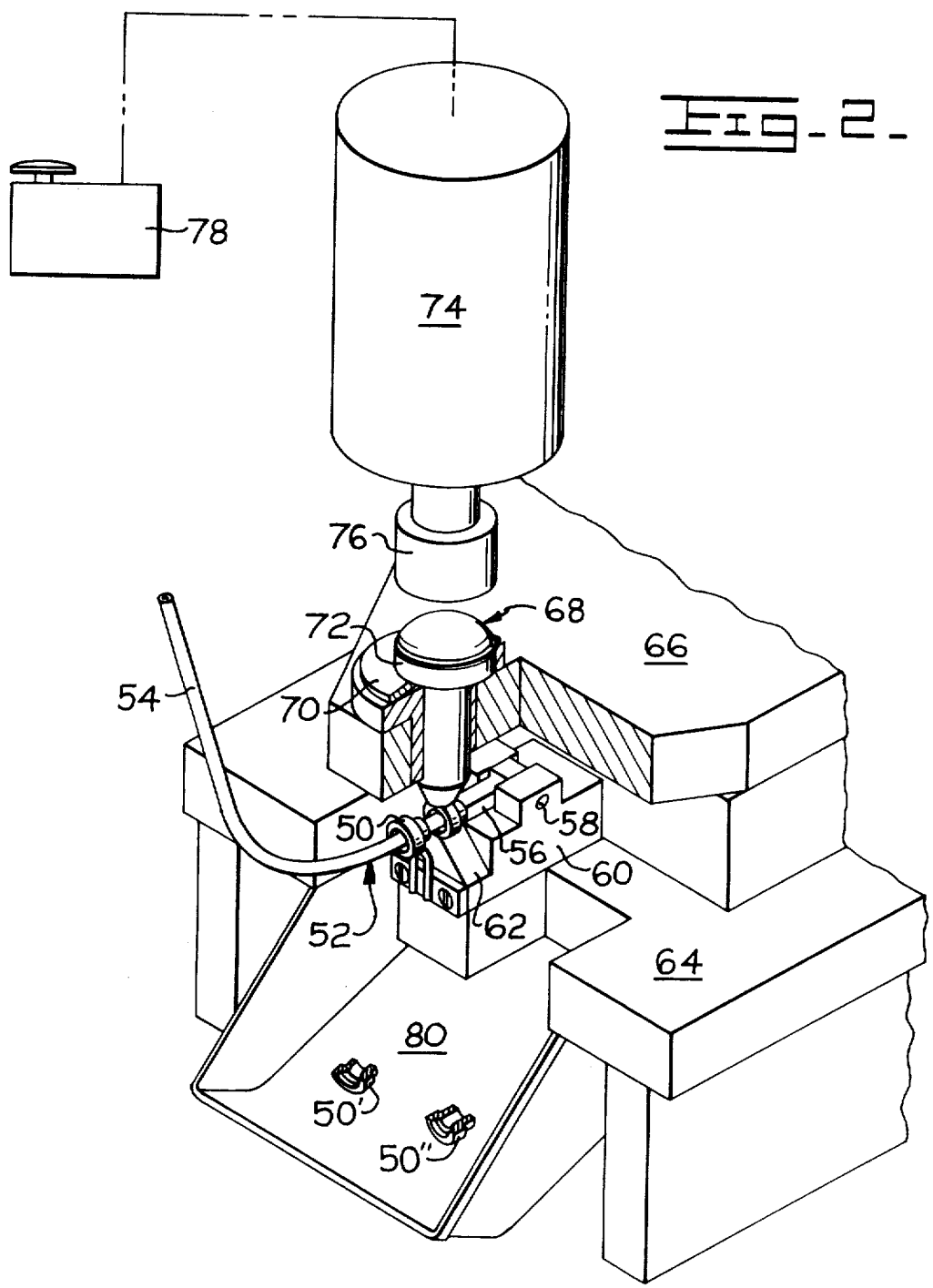
FIG. 2 is a perspective, partially broken-out view of apparatus for fabricating the invention split retainer in accordance with the invention process.

Referring now to FIG. 2, there is shown way of example only, apparatus for performing the fracturing to provide the invention split retainer in accordance with the invention process. To this end a plurality of preformed, "original" retainers 50 are loaded on a feeder unit 52, which is formed of a tube 54 secured at its lower end to a pivot member 56. Member 56 pivots horizontally about a pin 58 within a support block 60. The smaller diameter of the retainers 50 are disposed towards the member 56, wherein the tube 54 is positioned such that the larger diameter of the retainers are positioned slightly above, and out of contact with, a confronting portion of an anvil 62 when the retainer is in position for splitting. The anvil 62 is formed as a part of the block 60. The block 60 in turn is secured to, and/or otherwise supported upon, a base 64 of the fabricating device.

A hammer support member 66 is secured to the base 64, and extends generally above the anvil 62. A hammer 68 is reciprocally supported by the support member 66, with the lower end thereof immediately above, and in register with, the larger diameter of the retainer 50 when the latter is in splitting position immediately above the anvil 62.

A resilient member 70 is disposed between a flange 72 on the hammer, and the confronting support surface of the hammer support member 66. A hydraulic device (e.g., oil or air cylinder) or electrical solenoid, etc., herein depicted as an air motor 74, is supported immediately above the hammer 68, and a reciprocatable ram 76 thereof is coaxially disposed against the end of the hammer 68. A source of energy (e.g., air compressor, hydraulic pump, electrical power supply, etc., not shown) is operatively coupled to the air motor 74 as by means of an associated switch 78, whereby the motor operation may be controlled.

In performing the invention process a machine operator loads the feeder unit 52 with a plurality of original retainers 50. He than presses the actuating switch 78 to energize the motor 74 via energy from the energy source (not shown). The ram 76 moves rapidly downward to strike the top of the hammer 68, whereby the hammer strikes the confronting circumference of the retainer 50 on a line opposite the side facing the anvil 62. Urged downward by the hammer 68, the retainer 50 strikes the confronting anvil 62 along a line opposite the hammer. The sharp blow from the hammer splits the retainer 50 into substantially equal halves 50' and 50'', due in part to the fine granular structure of the material described above. The halves fall into a catch basin 80 and are collected as complementary halves of one retainer. The ram 76 is returned upward by the motor mechanism, a spring, or other such means, and the hammer 68 is returned to its upward position by the resilient member 70, which was compressed during the fracturing operation.

If desired, the retainer may be adapted during the forming process with axially extending pre-saw cuts, or the like, along the outside diameter and/or circumferential surfaces, to "guide" the fracture thereof during the splitting process. That is, stress concentrations may be formed or otherwise provided in the retainer to aid the splitting process, although such stress concentrations are not generally required.

Although the invention process and product are herein described with reference to a specific configuration of a spring retainer for use in a capsule or check valve, etc., it is to be understood that the process may be applied to form any such split structure which can be readily assembled as described to define the original single device configuration.

What is claimed is:

1. A process for fabricating a split retainer capable of being inserted within the end of a spring and about a centrally extending stem therethrough to retain and confine the spring under selected compression, comprising the steps of; forming a substantially cylindrical original retainer having a central bore from a selected material capable of being readily split; supporting said original retainer in selected orientation; and subjecting the supported original retainer to a sharp physical blow along selected exterior axially longitudinal portions thereof to cause the retainer to split into at least two pieces along a plane corresponding to said selected portions.

2. The process of claim 1, wherein the original retainer is formed of a steel of relatively fine granular structure of selected hardness.

3. The process of claim 1, wherein the original retainer is supported against anvil means along an axially extending line corresponding to said selected portions, and the sharp blow is applied to the retainer along a line diametrically opposed to the line which bears against the anvil means.

* * * * *